(12) United States Patent
Jeong et al.

(10) Patent No.: US 11,511,235 B2
(45) Date of Patent: *Nov. 29, 2022

(54) FILTER ASSEMBLY, METHOD FOR MANUFACTURING SAME, AND FILTER MODULE COMPRISING SAME

(71) Applicant: AMOGREENTECH CO., LTD., Gyeonggi-do (KR)

(72) Inventors: Ui Young Jeong, Incheon (KR); In Yong Seo, Seoul (KR)

(73) Assignee: Amogreentech Co., Ltd., Gimpo-si (KR)

( * ) Notice: Subject to any disclaimer, the term of this patent is extended or adjusted under 35 U.S.C. 154(b) by 179 days.

This patent is subject to a terminal disclaimer.

(21) Appl. No.: 16/305,954

(22) PCT Filed: May 31, 2017

(86) PCT No.: PCT/KR2017/005704
§ 371 (c)(1),
(2) Date: Nov. 30, 2018

(87) PCT Pub. No.: WO2017/209520
PCT Pub. Date: Dec. 7, 2017

(65) Prior Publication Data
US 2019/0291057 A1 Sep. 26, 2019

(30) Foreign Application Priority Data
May 31, 2016 (KR) .......................... 10-2016-0067734

(51) Int. Cl.
*B01D 67/00* (2006.01)
*B01D 69/02* (2006.01)
(Continued)

(52) U.S. Cl.
CPC ......... *B01D 67/0088* (2013.01); *B01D 35/30* (2013.01); *B01D 39/08* (2013.01);
(Continued)

(58) Field of Classification Search
None
See application file for complete search history.

(56) References Cited

U.S. PATENT DOCUMENTS 4,755,299 A * 7/1988 Bruschke ............... B01D 71/16
210/640
10,850,239 B2 * 12/2020 Jeong ........................ D01F 8/00
(Continued)

FOREIGN PATENT DOCUMENTS

KR 10-2011-0120202 A 11/2011
KR 10-2014-0103866 A 8/2014
(Continued)

OTHER PUBLICATIONS

Brian Bolto, Thuy Tran, Manh Hoang, Zongli Xie, Crosslinked poly(vinyl alcohol) membranes, Progress in Polymer Science, vol. 34, Issue 9, 2009, pp. 969-981 (Year: 2009).*

Kim et al., Preparation of Composite Membranes Via PVA/PAM Solution Coating onto Hydrophilized PVDF Hollow Fiber Membrane and Their Pervaporation Separation of Water-ethanol Mixture, Membrane Journal, vol. 23 No. 4 Aug. 2013, 312-318 (Year: 2013 ).*
(Continued)

*Primary Examiner* — Jason M Greene
*Assistant Examiner* — Eric J McCullough
(74) *Attorney, Agent, or Firm* — Rothwell, Figg, Ernst & Manbeck, P.C.

(57) ABSTRACT

A filter assembly including a filtration medium comprising a nanofiber, having a three-dimensional network structure, and having a fiber web layer comprising a hydrophilic coating layer that covers at least a part of the outer surface
(Continued)

of the nanofiber; and a first support body that supports the filtration medium, which is provided on both surfaces thereof, and has a channel formed therein. Accordingly, the filtration medium has excellent chemical resistance and improved hydrophilicity such that the flow rate can increase substantially. In addition, the improved hydrophilicity is maintained for a long period of time such that the utilization period can be extended substantially. Furthermore, any change in the pore structure of the filtration medium during the hydrophilicity endowing process is minimized such that the initially designed physical characteristics of the filtration medium can be fully exhibited.

12 Claims, 7 Drawing Sheets

(51) Int. Cl.
    *B01D 69/12*     (2006.01)
    *B01D 39/08*     (2006.01)
    *B01D 35/30*     (2006.01)
    *B01D 39/16*     (2006.01)

(52) U.S. Cl.
    CPC .............. *B01D 39/16* (2013.01); *B01D 69/02* (2013.01); *B01D 69/12* (2013.01); *B01D 2323/02* (2013.01); *B01D 2325/36* (2013.01)

(56) References Cited

U.S. PATENT DOCUMENTS

| | | | | |
|---|---|---|---|---|
| 2002/0066699 | A1* | 6/2002 | Boggs | A61M 1/3686 210/483 |
| 2010/0107881 | A1* | 5/2010 | Healey | B01D 63/14 96/11 |
| 2010/0323573 | A1* | 12/2010 | Chu | B01D 71/08 442/153 |
| 2014/0319706 | A1* | 10/2014 | Huizing | B29D 99/005 261/102 |
| 2015/0360157 | A1* | 12/2015 | Hwang | B32B 37/24 210/333.01 |

FOREIGN PATENT DOCUMENTS

| | | | | |
|---|---|---|---|---|
| KR | 10-2015-0079176 A | 7/2015 | | |
| KR | 101734120 B1 * | 5/2017 | ............ | B82Y 40/00 |
| WO | WO-0105492 A1 * | 1/2001 | ............ | B01D 71/34 |
| WO | 2011-052865 A1 | 5/2011 | | |
| WO | 2017-065564 A1 | 4/2017 | | |

OTHER PUBLICATIONS

International Search Report cited in PCT/KR2017/005704 dated Sep. 19, 2017, 2 pages.

* cited by examiner

FILTER ASSEMBLY, METHOD FOR MANUFACTURING SAME, AND FILTER MODULE COMPRISING SAME

CROSS REFERENCE TO RELATED APPLICATION

This application is a 35 U.S.C. 371 National Phase Entry Application from PCT/KR2017/005704, filed May 31, 2017, which claims the benefit of Korean Patent Application No. 10-2016-0067734 filed on May 31, 2016, the disclosures of which are incorporated herein in their entirety by reference.

TECHNICAL FIELD

The present invention relates to a filter assembly, and more specifically, to a filter assembly which has high water permeability as well as high durability and secures mechanical strength capable of withstanding high pressure during backwashing, a method of manufacturing the filter assembly, and a filter module including the filter assembly.

BACKGROUND ART

Separation membranes may be classified into microfiltration (MF) membranes, ultrafiltration (UF) membranes, nanofiltration (NF) membranes, and reverse osmosis (RO) membranes according to a pore size.

Although the above-exemplified separation membranes differ in usages and pore sizes, the separation membranes have a common feature of being filtration media composed of a fiber or porous polymer filtration media or having the form of a composite membrane thereof.

Generally, the porous polymer filtration media are prepared through a method of forming pores in a polymer membrane or a polymer hollow fiber using a separate pore-forming agent contained in a solution by sintering the pore-forming agent or dissolving the pore-forming agent in an external coagulating solution. On the other hand, the filtration media composed of the fiber are generally prepared by accumulating produced short fibers and then applying heat, pressure, or the like thereto, or by spinning the short fibers and concurrently applying heat, pressure or the like thereto.

A typical example of the filtration media composed of the fiber is a nonwoven fabric. In general, pores of the nonwoven fabric are controlled by a diameter of a short fiber, a basis weight of a medium, and the like. However, since a diameter of a short fiber included in a general nonwoven fabric is in the unit of microns, there is a limitation in implementing a separation membrane having a fine and uniform pore structure only by controlling a diameter and basis weight of a fiber. Accordingly, only a separation membrane such as a microfiltration membrane may be implemented using a general nonwoven fabric, and it is difficult to implement a separation medium such as an ultrafiltration membrane or a nanofiltration membrane for filtering finer particles.

A method designed to solve the problem is to use a separation membrane formed of a microfiber having a nanoscale fiber diameter. However, it is difficult to prepare a microfiber having a nanoscale diameter by spinning only once through a general fiber pinning process such as a wet spinning process, and it is necessary to spin sea-island yarn or the like and separately elute a sea component to obtain an island component which is a microfiber, and thus there are problems of inconvenience, a cost increase, extension of production time. Accordingly, recently, there has been a tendency to directly spin a fiber having a nanoscale diameter through electrospinning and produce a large number of filtration media composed of the fiber.

On the other hand, one of the physical properties suitable for water treatment application is flux, which is influenced by the degree of hydrophilicity of a material of a separation membrane as well as the porosity, pore size, and pore structure of the separation membrane. In the case of a separation membrane made of a material having low hydrophilicity, flux is improved through a method such as plasma treatment, surface modification with a hydrophilic group, being coated with a separate hydrophilic layer, or the like.

However, when a material of a separation membrane has high hydrophobicity, it is not easily to modify the separation membrane so as to be hydrophilic. Even when the separation membrane is modified to be hydrophilic, flux may not be increased to a desired level, and the hydrophilicity of the separation membrane easily disappears during use. Thus, there is a problem in that the durability of the separation membrane is low.

In addition, in a process of hydrophilizing the separation membrane, a pore structure of the separation membrane itself before the hydrophilizing, that is, porosity and a pore size, may be changed. Accordingly, since a pore structure of the separation membrane, which is initially designed to achieve a desired flux and separation efficiency, is changed, there may be a problem in that flux and separation efficiency may not be obtained to a desired level.

Furthermore, when a filtration process is performed at high pressure or when higher pressure is applied in a backwashing process, the separation membrane is damaged, and a channel is not secured as the separation membrane is compressed, thereby resulting in a significant decrease in flux.

Accordingly, there is an urgent need to develop a filter assembly in which hydrophilicity of a separation membrane is improved to significantly increase flux and minimize a change in pore structure of the separation membrane itself, durability is provided to maintain hydrophilicity for a long period of time, and a decrease in flux and damage of the separation membrane are prevented even when high pressure is applied to the filter assembly.

TECHNICAL SOLUTION

The present invention has been made in consideration of the above-mentioned actual circumstances and is directed to providing a filter assembly in which hydrophilicity of a separation membrane is improved to considerably increase flux, and a method of manufacturing the same.

In addition, the present invention is directed to providing a filter assembly in which hydrophilicity is maintained for a long period of time and thus a use cycle is considerably increased, and a method of manufacturing the same.

Furthermore, the present invention is directed to providing a filter assembly in which a change in pore structure of a medium is minimized in a hydrophilizing process to fully exhibit initially designed physical properties of the medium, and a method of manufacturing the same.

In addition, the present invention is directed to providing a filter assembly in which a channel is secured even at high pressure applied in filtrating and/or backwashing processes and a damage to a membrane is concurrently minimized, and a method of manufacturing the same.

In addition, the present invention is directed to providing a filter module which is variously applicable in a water treatment field through a filter assembly having chemical resistance, high water permeability, and durability.

In order to solve the above problems, the present invention provides a filter assembly including: media each including a fiber web layer which has a three-dimensional network structure including a nanofiber and includes a hydrophilic coating layer covering at least a portion of an outer surface of the nanofiber; and a first support body configured to support the media provided on both surfaces thereof and to form a channel.

According to an exemplary embodiment of the present invention, each of the media may further include a second support body provided on one side of the fiber web layer, and the second support body may be disposed to face the first support body. In this case, the second support body may include at least one selected from a nonwoven fabric, a fabric, and a knitted fabric.

The first support body may include at least one selected from a nonwoven fabric, a fabric, and a knitted fabric.

The first support body may include a composite fiber which includes a support component and a low melting point component and is disposed such that at least a portion of the low melting point component is exposed at an outer surface thereof, and the low melting point component of the composite fiber may be thermally fused to the medium.

The second support body may include a composite fiber which includes a support component and a low melting point component and is disposed such that at least a portion of the low melting point component is exposed at an outer surface thereof, wherein an interface of the fiber web layer, which faces the second support body, is thermally fused through the low melting point component of the composite fiber, and an interface of the first support body, which faces the second support body, is thermally fused.

The nanofiber may include at least one fluorine-based compound selected from the group consisting of polytetrafluoroethylene (PTFE)-based, tetrafluoroethylene-perfluoroalkyl vinyl ether (PFA) copolymer-based, tetrafluoroethylene-hexafluoropropylene (FEP) copolymer-based, tetrafluoroethylene-hexafluoropropylene-perfluoroalkyl vinyl ether copolymer (EPE)-based, tetrafluoroethylene-ethylene (ETFE) copolymer-based, polychlorotrifluoroethylene (PCTFE)-based, chlorotrifluoroethylene-ethylene (ECTFE) copolymer-based, and polyvinylidene fluoride (PVDF)-based compounds.

The fiber web layer may have an average pore size of 0.1 μm to 5 μm and a porosity of 40% to 90%.

The nanofiber may have a diameter of 0.05 μm to 2 μm.

The hydrophilic coating layer may be formed by cross-linking a hydrophilic polymer compound including a hydroxy group and a cross-linking agent including a carboxyl group. In this case, the cross-linking agent may include at least three carboxyl groups.

The hydrophilic polymer compound may include polyvinyl alcohol having a weight average molecular weight of 20,000 to 100,000 and a saponification degree of 85% to 90%.

The fluorine-based compound may be a PVDF-based compound having a weight average molecular weight of 300,000 to 600,000

The hydrophilic coating layer may cover the nanofiber so as to be included in an amount of 0.1 g to 2 g per unit area ($m^2$) of a fiber web layer.

The cross-linking agent may include at least one material selected from the group consisting of poly(acrylic acid-maleic acid), a polyacrylic acid, and poly(styrenesulfonic acid-maleic acid).

The hydrophilic polymer compound may be polyvinyl alcohol, and the hydrophilic coating layer may include 5 to 20 parts by weight of the cross-linking agent with respect to 100 parts by weight of the polyvinyl alcohol.

The first support body may have a basis weight of 200 $g/m^2$ to 800 $g/m^2$ and a thickness of 1 mm to 10 mm.

The second support body may have a basis weight of 10 $g/m^2$ to 200 $g/m^2$ and a thickness of 0.05 mm to 0.5 mm.

An average initial wetting angle may be less than or equal to 40° and an average deviation of an initial wetting angle may be less than or equal to 7° at any five different points on an exposed surface of the fiber web layer.

The present invention provides a method of manufacturing a filter assembly, the method including: (1) forming a fiber web layer with a three-dimensional network structure including a nanofiber; (2) treating the fiber web layer with a hydrophilic coating composition to prepare media on which a hydrophilic coating layer is formed; and (3) providing the media on both surfaces of a first support body.

According to an exemplary embodiment of the present invention, the fiber web layer of step (1) may be formed by electrospinning a spinning solution including a fluorine-based compound on a second support body.

Step (1) may further include thermally fusing the first support body and the fiber web layer by applying any one or more of heat and pressure to the first support body and the fiber web layer stacked after the electrospinning.

The hydrophilic coating composition may further include a wettability enhancer for improving formability of the hydrophilic coating layer on an outer surface of the nanofiber, wherein the wettability enhancer includes at least one selected from the group consisting of isopropyl alcohol, ethyl alcohol, and methyl alcohol.

The hydrophilic coating composition may include polyvinyl alcohol (PVA) as a hydrophilic polymer compound and may include 5 to 20 parts by weight of a cross-linking agent including a carboxyl group with respect to 100 parts by weight of the PVA.

The hydrophilic coating composition may include 0.3 to 1 part by weight of PVA as a hydrophilic polymer compound.

Step (3) may include may include 3-1) stacking the prepared media on both surfaces of the first support body, and 3-2) fusing the stacked first support body and media by applying at least one of heat and pressure.

The present invention provides a filter module including the filter assembly according to the present invention.

According to an exemplary embodiment of the present invention, the filter module may be a flat filter module in which a filter assembly is provided as a flat membrane or may be a cylindrical filter module in which a filter assembly is wound in a cylindrical shape.

Advantageous Effects

According to the present invention, flux can be considerably increased due to improved hydrophilicity of a medium. In addition, hydrophilicity can be maintained for a long period of time and thus a use cycle can be considerably increased. Furthermore, a change in pore structure of a medium can be minimized in a hydrophilizing process to fully exhibit initially designed physical properties of the medium. In addition, since a channel is secured even at high pressure applied in filtrating and/or backwashing processes, a decrease in flux can be prevented, and a damage to a membrane can be minimized Thus, the present invention can be variously applied in a water treatment field through a filter assembly having chemical resistance, high water permeability, and durability.

DESCRIPTION OF DRAWINGS

FIG. 3A is a cross-sectional view illustrating a filter assembly including a first support body that is a nonwoven fabric, and FIG. 3B is a cross-sectional view illustrating a filter assembly including a first support body that is a tricot.

FIG. 4A is a cross sectional-view illustrating the filter module, and FIG. 4B is a schematic view illustrating a filtration flow with respect to a cross-sectional view taken along line X-X' of FIG. 4A.

FIG. 7A is a SEM image showing a surface of the fiber web layer, FIG. 7B is a SEM image showing a cross section of the fiber web layer.

MODES OF THE INVENTION

Figure 1:
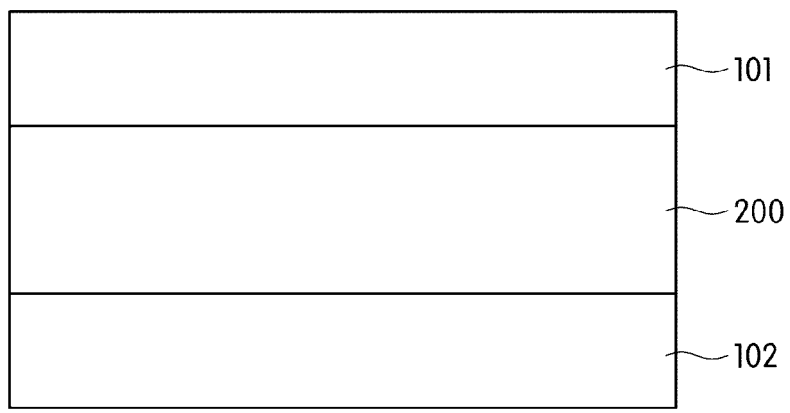
FIG. 1 is a cross-sectional view illustrating a filter assembly according to an exemplary embodiment of the present invention.

Hereinafter, exemplary embodiments of the present invention will be described in detail with reference to the accompanying drawings so as to be easily practiced by a person of ordinary skill in the art. It should be understood that the present invention may be embodied in different ways and is not limited to the following exemplary embodiments. Parts irrelevant to description are omitted in the drawings in order to clearly explain the embodiments of the present invention, and like reference numerals refer to like elements throughout the specification.

As shown in FIG. 1, a filter assembly 1000 according to an exemplary embodiment of the present invention is implemented to include a first support body 200 disposed between a first medium 101 and a second medium 102 which each include a fiber web layer.

Figure 2:
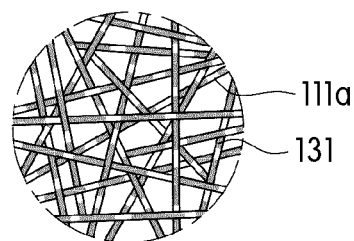
FIG. 2 shows a cross-sectional view and a partial enlarged view illustrating the filter assembly according to the exemplary embodiment of the present invention.
Figure 2:
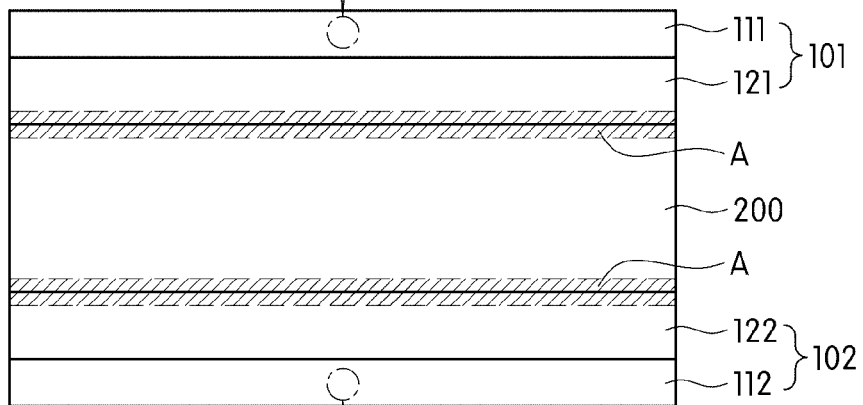
Figure 2:
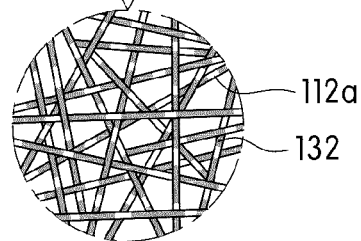

As shown in FIG. 2, the first medium 101 and the second medium 102 may further include second support bodies 121 and 122 disposed on one surfaces of fiber web layers 111 and 112. In this case, the second support bodies 121 and 122 may be disposed to face the first support body 200 in the filter assembly 1000.

First, the first medium 101 and the second medium 102 disposed on both surfaces of the first support body 200 will be described.

As shown in FIG. 2, the media 101 and 102 according to the exemplary embodiment of the present invention may be implemented to include the second support bodies 121 and 122 and the fiber web layers 111 and 112 having a three-dimensional network structure. In addition, hydrophilic coating layers 131 and 132 are applied to at least portions of outer surfaces of nanofibers 111a and 112a forming the fiber web layers 111 and 112.

The second support bodies 121 and 122 are not particularly limited as long as they generally serve as a support body of a medium. The shape of the second support bodies 121 and 122 may be a shape of a fabric, a knitted fabric, or a nonwoven fabric. The fabric means that a fiber included in the fabric has longitudinal and transverse directionalities. A specific structure of the fabric may be a plain weave, a twilled weave, or the like, and density of warp yarn and weft yarn is not particularly limited. In addition, the knitted fabric may have a known knit structure and may be a weave knitted fabric, a light knitted fabric, or the like, but the present invention is not particularly limited thereto. Furthermore, the nonwoven fabric means that a fiber included in the nonwoven fabric has no longitudinal or transverse directionality. The nonwoven fabric may be a known nonwoven fabric such as a dry nonwoven fabric such as a chemical bonding nonwoven fabric, a thermal bonding nonwoven fabric, or an airlaid nonwoven fabric, a wet nonwoven fabric, a spunless nonwoven fabric, a needle punching nonwoven fabric, or a meltblown nonwoven fabric. The pore size, porosity, basis weight, and the like of the nonwoven fabric may be changed according to desired water permeability, filtration efficiency, and mechanical strength, and thus, the present invention is not particularly limited thereto.

A material of the second support bodies 121 and 122 is not limited as long as the material is used as a support body of a medium. A non-limiting example of the second support bodies 121 and 122 may include a synthetic fiber selected from the group consisting of polyester, polypropylene, nylon, and polyethylene; or a natural fiber including a cellulose-based fiber. However, in order to prevent separation between the fiber web layers and the second support bodies when a water treatment process is performed on the media in order to improve a binding force with the fiber web layers 111 and 112 to be described below, and to prevent problems such as a decrease in water permeability, environmental pollution, and pollution of a filtrate according to use of a separate adhesive component, the second support bodies 121 and 122 may include a low melting point composite fiber which includes a supporting component and a low melting point component and is disposed such that at least a portion of the low melting point component is exposed at an outer surface thereof. The second support bodies 121 and 122 may be thermally fused to the fiber web layers 111 and 112 through the low melting point component. The low melting point component may be a known component and may include, for example, a low melting point polymer compound such as low melting point polyester or low melting point polyethylene. More preferably, the low melting point polymer compound may be disposed to be entirely exposed at an outer surface of a fiber. In an example, a fiber forming the second support bodies 121 and 122 may include a polyester-based low melting point composite fiber including low melting point polyester as a sheath portion and polyethylene terephthalate as a core portion and/or a polyolefin-based low melting point composite fiber including low melting point polyester as a sheath portion and polypropylene as a core portion. On the other hand, when the polyolefin-based low melting point composite fiber is selected as a composite fiber provided in the second support bodies 121 and 122, adhesion with the fiber web layers 111 and 112 may be higher. As a result, there is an advantage in that peeling is prevented even when the filter assembly flows due to the pressure of raw water introduced into the filter assembly. Meanwhile, the low melting point component may have a melting point of 60° C. to 180° C. In addition, the composite fiber forming the support body 121 may have an average diameter of 5 μm to 30 μm.

Furthermore, a thickness of the second support bodies 121 and 122 may be in a range of 0.05 mm to 0.5 mm, for example, 180 μm. In addition, the second support bodies 121 and 122 may have an average pore size of 20 μm to 100 μm and a porosity of 50% to 90%. Furthermore, the second support bodies 121 and 122 may have a basis weight of 10 g/m$^2$ to 200 g/m$^2$. However, the present invention is not limited thereto. There are no restriction on porosity, basis weight, and pore size as long as the second support bodies 121 and 122 have a degree of the porosity, basis weight, and pore size so as to support fiber web layers 111 and 112 to be described below to exhibit a desired level of mechanical strength and so as not to inhibit a flow of a filtrate introduced through the fiber web layers 111 and 112 or a flow of a liquid, which is to be filtered, being supplied to the fiber web layers 111 and 112.

Next, as shown in FIG. 2, the fiber web layers 111 and 112 have three-dimensional network structures composed of the nanofibers 111a and 112a.

The nanofibers 111a and 112a may be a known polymer compound which may be formed to have a fiber shape and may maintain the fiber shape. A non-limiting example of the nanofibers 111a and 112a may include at least one selected from polyurethane, polyester, polyolefin, polyamide, a fluorine-based compound, and the like. The nanofibers 111a and 112a may include a fluorine-based compound to exhibit more improved chemical resistance and heat resistance. In addition, there is an advantage in that, even when raw water is a strong acid/strong base solution or a high temperature solution, filtration efficiency and flux may be secured to a desired level without changing physical properties of a filter medium. The fluorine-based compound may be used without limitation as long as the fluorine-based compound is a known fluorine-based compound capable of being formed into a nanofiber. In an example, the fluorine-based compound may include at least one compound selected from the group consisting of polytetrafluoroethylene (PTFE)-based, tetrafluoroethylene-perfluoroalkyl vinyl ether (PFA) copolymer-based, tetrafluoroethylene-hexafluoropropylene (FEP) copolymer-based, tetrafluoroethylene-hexafluoropropylene-perfluoroalkyl vinyl ether copolymer (EPE)-based, tetrafluoroethylene-ethylene (ETFE) copolymer-based, polychlorotrifluoroethylene (PCTFE)-based, chlorotrifluoroethylene-ethylene (ECTFE) copolymer-based, and PVDF-based compounds. More preferably, the fluorine-based compound may be PVDF in terms of a low production unit cost, ease of mass production of a nanofiber through electrospinning, and high mechanical strength and chemical resistance. In this case, when the nanofiber 111a includes PVDF as a fiber-forming component, a weight average molecular weight of the PVDF may be in a range of 10,000 to 1,000,000, and preferably, in a range of 300,000 to 600,000, but the present invention is not limited thereto.

In addition, the nanofibers 111a and 112a may have an average diameter of 0.05 μm to 2 μm and an aspect ratio of 1,000 to 100,000, but the present invention is not limited thereto. In an example, each of the nanofibers 111a and 112a provided in the fiber web layers 111 and 112 may include 30 to 40 wt % of a first nanofiber group having a diameter of 0.1 μm to 0.2 μm, 50 to 60 wt % of a second nanofiber group having a diameter of 0.2 μm to 0.3 μm, and 5 to 15 wt % of a third nanofiber group having a diameter 0.3 μm to 0.4 μm with respect to the total weight of each of the fiber web layers 111 and 112. In an example, each of the nanofibers 111a and 112a may include 35 wt % of the first nanofiber group, 53 wt % of the second nanofiber group, and 12 wt % of the third nanofiber group with respect to the total weight of each of the fiber web layers 111 and 112. As a result, this may be advantageous for implementing a fiber web layer to have a more uniform pore structure.

A thickness of the fiber web layers 111 and 112 having the three-dimensional network structures composed of the nanofibers 111a and 112a may be in a range of 0.5 μm to 200 μm, for example, 20 μm. The fiber web layer 111 may have a porosity of 40% to 90%, an average pore size of 0.1 μm to 5 μm, and a basis weight of 0.05 g/m$^2$ to 100 g/m$^2$, but the present invention is not limited thereto. The porosity, the average pore size, and the basis weight may be appropriately changed in consideration of desired water permeability and filtration efficiency.

In addition, the fiber web layers 111 and 112 may be provided as one or more layers in the media 101 and 102, and the layers of the fiber web layers may differ in porosity, pore size, basis weight and/or thickness.

Next, the hydrophilic coating layers 131 and 132 covering at least portions of the outer surfaces of the nanofibers 111a and 112a will be described.

The nanofibers 111a and 112a may have low hydrophilicity according to a selected material. When the nanofibers 111a and 112a include a fluorine-based compound for heat resistance and chemical resistance as described above, hydrophobicity of the nanofiber may become very high, and thus, flux may be considerably decreased with respect to hydrophilic raw water.

On the other hand, in order to solve such a problem, although hydrophilic coating is performed on a surface of a nanofiber including a fluorine-based compound, a hydrophilic material is applied on the hydrophobic surface of the nanofiber. Thus, a coating layer is not formed well. Although the coating layer is formed, the coating layer is easily peeled off, resulting in low durability. In addition, when a hydrophilic coating layer is thickly formed, a pore structure of a fiber web layer may be changed so that initially designed physical properties of the fiber web layer may not be fully exhibited. Furthermore, in order to solve such a problem, in the case of a nanofiber implemented by mixing a hydrophilic component and a fluorine-based compound into a fiber-forming component, miscibility between the compounds is low due to heterogeneous properties. Thus, it is difficult to prepare the nanofiber through electrospinning or it is difficult for the prepared nanofiber to be used in a filter medium due to considerably low mechanical strength of the prepared nanofiber.

Accordingly, in the present invention, the hydrophilic coating layers covering the nanofibers are provided to improve hydrophilicity. The hydrophilic coating layers 131 and 132 may be formed to include a hydrophilic polymer including a hydroxy group or may be formed by cross-linking the hydrophilic polymer using a cross-linking agent. In an example, the hydrophilic polymer may be in the form of one or a mixture of polyvinyl alcohol (PVA), ethylenevinyl alcohol (EVOH), sodium alginate, and the like, and most preferably, may be PVA. In addition, the cross-linking agent may be used without limitation as long as the cross-linking agent is a known cross-linking agent including a functional group capable of being cross-linked with the hydroxy group included in the hydrophilic polymer through a condensation reaction or the like. For example, the functional group may be a hydroxyl group, a carboxyl group, or the like.

In order to exhibit more improved physical properties, the hydrophilic coating layers 131 and 132 may be formed by cross-linking a cross-linking agent including PVA and a carboxy group. In this case, a polymerization degree of the PVA may be more preferably in a range of 500 to 2,000, and still more preferably, in a range of 1,500 to 2,000, and a saponification degree thereof may be in a range of 85% to 90%. Specifically, a weight average molecular weight of the polyvinyl alcohol may be in a range of 20,000 to 100,000, and more preferably, in a range of 50,000 to 100,000. When the weight average molecular weight of the polyvinyl alcohol is less than 20,000, the formation of a hydrophilic coating layer may not be smooth, or although the hydrophilic coating layer is formed, the hydrophilic coating layer may be easily peeled off, and hydrophilicity may not be improved to a desired level. In addition, when the weight average molecular weight exceeds 100,000, the formation of a hydrophilic coating layer may be excessive. Thus, a pore structure of a fiber web layer may be changed, or pores may be closed. When the saponification degree is less than 85%, the formation of a hydrophilic coating layer may become unstable, and a degree of improvement in hydrophilicity may be insignificant. When the saponification degree exceeds 90%, a hydrogen bond between molecules of the polyvinyl alcohol may be strong. Thus, it may be difficult for the polyvinyl alcohol to be dissolved in a solvent even at high temperature, or although the polyvinyl alcohol is dissolved, it may be difficult for the polyvinyl alcohol to be completely dissolved. As a result, a hydrophilic coating layer may not be properly formed, although the hydrophilic coating layer is formed, the hydrophilic coating layer may be non-uniformly formed, and some pores may be closed. Accordingly, desired effects may not be achieved.

The cross-linking agent may be a component containing a carboxyl group so as to be cross-linked with the above-described polyvinyl alcohol. In an example, the cross-linking agent may include at least one material selected from the group consisting of poly(acrylic acid-maleic acid), a polyacrylic acid, and poly(styrenesulfonic acid-maleic acid). Furthermore, the cross-linking agent may be a polyfunctional cross-linking agent including at least three carboxyl groups so as to be applied very thinly such that more improved coating and adhesive properties on hydrophobic surfaces of the nanofibers 111a and 112a and a pore structure of the fiber web layers 111 and 112 are not changed, and so as to concurrently exhibit more improved flux. When the number of the carboxyl groups included in the cross-linking agent is less than 3, it is difficult for a coating layer to be formed on the hydrophobic surfaces of the nanofibers 111a and 112a, and although the coating layer is formed, an adhesion force may be very weak so that the coating layer may be easily peeled off. In an example, the cross-linking agent including at least three carboxyl groups may be poly(acrylic acid-maleic acid), and more preferably, be poly(acrylic acid-maleic acid) having a weight average molecular weight of 3,000 to 8,000.

The hydrophilic coating layers 131 and 132 may be formed by cross-linking 5 to 20 parts by weight, more preferably, 10 to 20 parts by weight of a cross-linking agent including a carboxyl group with respect to 100 parts by weight of the above-described polyvinyl alcohol. When the cross-linking agent is included in an amount less than 5 parts by weight, the formability of a hydrophilic coating layer may be decreased, and chemical resistance and mechanical strength may be lowered. In addition, when the cross-linking agent is included in an amount exceeding 20 parts by weight, coagulation between cross-linking agents may be generated in a hydrophilic coating composition, and thus, it may be difficult for a cross-linking reaction to uniformly occur. Therefore, a coating layer may be non-uniformly formed, or flux may be decreased because pores are decreased due to the coating layer.

On the other hand, the hydrophilic coating layers 131 and 132 may be formed on a portion of the outer surfaces of the nanofibers 11a and 112a, as shown in FIG. 2, or may be formed on the whole of the outer surfaces of the nanofibers unlike in FIG. 2. Here, the hydrophilic coating layers 131 and 132 may be applied to the nanofibers such that each of the hydrophilic coating layers 131 and 132 is included in an amount of 0.1 g to 2 g per unit area ($m^2$) of a fiber web. When each of the hydrophilic coating layers is applied in an amount less than 0.1 g per unit area ($m^2$) of the fiber web, it may be difficult to obtain a desired level of flux. When each of the hydrophilic coating layers is applied in an amount exceeding 2 g per unit area ($m^2$) of the fiber web, some pores may be closed to change a pore structure. Thus, a desired filtration rate/flux may not be obtained with an initially designed fiber web layer.

As described above, an average of initial wetting angles may be less than or equal to 40°, more preferably, less than or equal to 30°, still more preferably, less than or equal to 20°, yet still more preferably, less than or equal to 12°, and even more preferably, less than or equal to 5° at any five different points on a surface of each of the fiber web layers, which is modified and exposed in such a manner that the hydrophilic coating layers 131 and 132 are provided on the outer surfaces of the nanofibers 111a and 112a in the fiber web layers 111 and 112 provided in the implemented media 101 and 102. As a result, although the fiber web layers are made of a hydrophobic material, improved flux may be secured. The initial wetting angle means a wetting angle measured within 20 seconds after a droplet is formed on a sample. Due to a porous structure of a fiber web layer, when a droplet initially formed on a surface of the fiber web layer flows through pores, a wetting angle may be decreased. Thus, it is preferable that a degree of surface hydrophilization of the fiber web layer is evaluated at the initial wetting angle. On the other hand, a small change or no change in wetting angle as time passes after the droplet is formed means that the pores in the surface of the fiber web layer are closed due to a hydrophilic modification. As a result, it can be seen that an initially designed pore structure of the fiber web layer is changed due to the hydrophilic modification.

In addition, since a degree of hydrophilization is uniform at respective positions of exposed surfaces of the fiber web layers 111 and 112, an average deviation of initial wetting angles with respect to the five points at which an average initial wetting angles is measured may be less than or equal to 7°, more preferably, less than or equal to 5°, and still more preferably, less than or equal to 3°. When the average deviation of the initial wetting angles exceeds 7°, among the points of the fiber web layer, there may be a point at which a degree of hydrophilization is low even when an average initial wetting angle is low. Accordingly, the generation of differential pressure may be increased at the point at which the degree of the hydrophilization is low, and a desired level of flux may not be obtained. The average deviation of the initial wetting angles means an average of absolute values of a deviation between an initial wetting angle at each of the five points and an average initial wetting angle which is an arithmetic average of the initial wetting angles at each of the five points. Specifically, the average deviation may be calculated according to Expression 1 below:

$$\text{average deviation (°)} = \left(\sum_{k=1}^{5} |\text{average initial wetting angle (°)} - \text{initial wetting angle (°) of point } Xi|\right) / 5 \quad \text{[Expression 1]}$$

wherein point Xi refers to any one point of 5 different points (X1 to X5) at which an initial wetting angle is measured.

Next, the first support body 200 interposed between the above-described media 101 and 102 to support the media 101 and 102 and form a channel will be described.

As shown in FIG. 2, in the filter assembly 1000 according to the present invention, the media 101 and 102 configured to perform a filtration function are provided on both surfaces of the filter assembly 1000, and a filtration process may occur in such a manner that a liquid to be filtrated is filtrated while being introduced in an inward direction of the filter assembly from the outside of the fiber web layers 111 and 112 of the media 101 and 102, or the liquid to be filtrated passes through the filter assembly in a direction opposite to the inward direction. However, when pressure is applied during the filtration process, a force for compressing the filter assembly from both outer sides to an inner side of the filter assembly or a force for expanding the filter assembly from the inner side to the both outer sides may be applied, which may cause damage to the filter assembly. In addition, when the filter assembly is compressed from the both outer sides to the inner side of the filter assembly, a channel, through which a filtrate filtered in the inward direction of the filter assembly flows, may be blocked. Thus, a higher differential pressure may be applied to the filter assembly, and concurrently, flux may be considerably decreased. In order to solve such a problem, the first support body 200 is interposed between the first medium 101 and the second medium 102. Even when high pressure is applied to the filter assembly, the first support body 200 functions to secure a channel and prevent damage to the filter assembly.

Figure 3A:
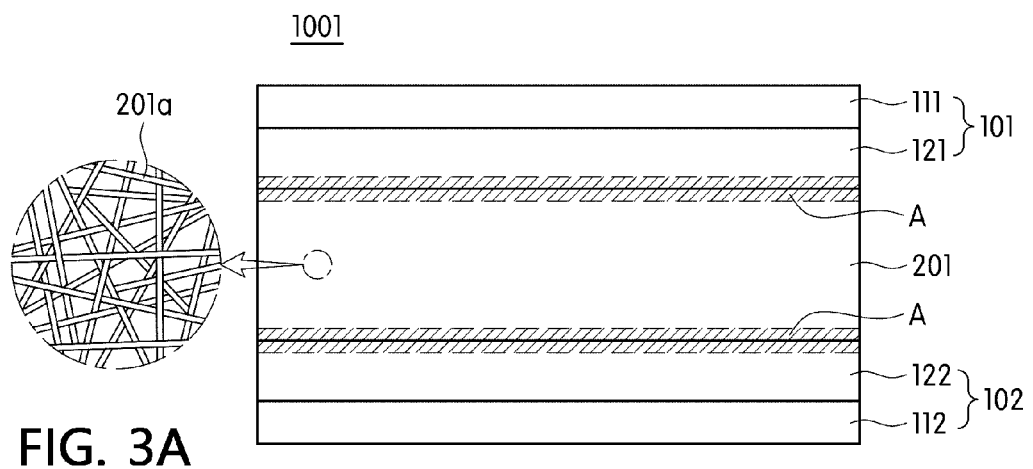
FIGS. 3A-3B are a set of cross-sectional views illustrating filter assemblies according to exemplary embodiments of the present invention.
Figure 3B:
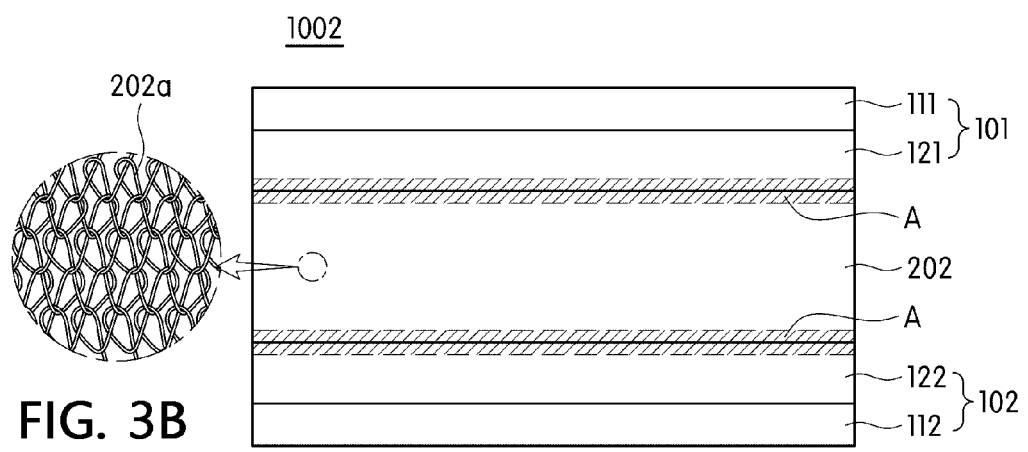

The first support body 200 is not particularly limited as long as it generally serves as a support body of a separation membrane. The shape of the first support body 200 may be a shape of a fabric, a knitted fabric, or a nonwoven fabric. The fabric represents that a fiber included in the fabric has longitudinal and transverse directionalities. A specific structure of the fabric may be a plain weave, a twilled weave, or the like, and density of warp yarn and weft yarn is not particularly limited. In addition, the knitted fabric may have a known knit structure and may be a weave knitted fabric, a light knitted fabric, or the like. In an example, as shown in FIG. 3B, the first support body 202 may be a tricot in which yarn 202a is warp knitted. Furthermore, as shown in FIG. 3A, the first support body 201 may include a nonwoven fabric in which a fiber 201a has no longitudinal or transverse directionality. The first support body may include a known nonwoven fabric such as a dry nonwoven fabric such as a chemical bonding nonwoven fabric, a thermal bonding nonwoven fabric, or an airlaid nonwoven fabric, a wet nonwoven fabric, a spunless nonwoven fabric, a needle punching nonwoven fabric, or a meltblown nonwoven fabric. When the first support body includes a nonwoven fabric, a pore size, porosity, basis weight, and the like may be changed according to desired water permeability, filtration efficiency, and mechanical strength, and thus, the present invention is not particularly limited thereto.

A material of the first support body 200 is not limited as long as it is used as a support body of a separation membrane. A non-limiting example of the first support body 200 may include a synthetic fiber selected from the group consisting of polyester, polypropylene, nylon, and polyethylene; or a natural fiber including a cellulose-based fiber. In order to improve a binding force with the above-described media 101 and 102 without a separate adhesive or adhesive layer, more specifically, in order to allow the first support body 200 to be thermally fused to the second support bodies 121 and 122 of the media 101 and 102, the first support body 200 may include a low melting point composite fiber which includes a supporting component and a low melting point component and is disposed such that at least a portion of the low melting point component is exposed at an outer surface thereof. The low melting point component may be a known component and may include, for example, a low melting point polymer compound such as low melting point polyester or low melting point polyethylene. More preferably, the low melting point polymer compound may be disposed to be entirely exposed at an outer surface of a fiber. In an example, a fiber forming the first support body 200 may include a polyester-based low melting point composite fiber including low melting point polyester as a sheath portion and polyethylene terephthalate as a core portion and/or a polyolefin-based low melting point composite fiber including low melting-point polyester as a sheath portion and polypropylene as a core portion. In this case, the low melting point polymer compound may have a melting point of 60° C. to 180° C.

Meanwhile, all of the first support body 200 and the second support bodies 121 and 122 may be composed of a composite fiber including a low melting point component so that a heat fusion portion A of FIG. 2 may be further stabilized to prevent detachment and separation of the filter assembly. In addition, the first support body 200 and the second support bodies 121 and 122 may be composed of a low melting point composite fiber including a sheath portion with the same melting point and material. As a result, this may be advantageous for exhibiting a more improved bonding force.

In addition, the first support body 200 may have a thickness of 1 mm to 10 mm, for example, 5 mm, and may have a basis weight of 200 g/m² to 800 g/m², but the present invention is not limited thereto. Furthermore, a fiber forming the first support body 200 may have an average diameter of 5 μm to 30 μm. In addition, the first support body 200 may have an average pore size of 20 μm to 200 μm and a porosity of 50% to 90%, but the present invention is not limited thereto. There are no restriction on porosity and pore size as long as the first support body 200 has a degree of the porosity and pore size so as to support the above-described media 101 and 102 to exhibit a desired level of mechanical strength and concurrently to smoothly form a channel even at high pressure.

The above-described filter assembly 1000 may be manufactured through a manufacturing method to be described below, but the present invention is not limited thereto.

The filter assembly 1000 according to the present invention may be manufactured through a method including (1) forming a fiber web layer with a three-dimensional network structure including a nanofiber, (2) treating the fiber web layer with a hydrophilic coating composition on to prepare media on which a hydrophilic coating layer is formed, and (3) providing the media on both surfaces of a first support body.

First, step (1) will be described. The present step is an step of forming the fiber web layer. A method of providing a nanofiber to form a fiber web layer having a three-dimensional network shape may be used without limitation. The fiber web layer may be formed by electrospinning a spinning solution including a fluorine-based compound on a second support body.

The spinning solution may include a fluorine-based compound as a fiber-forming component and a solvent. The fluorine-based compound may be included in an amount of 5 to 30 wt %, preferably, 8 to 20 wt % in the spinning solution. When the fluorine-based compound is included in an amount less than 5 wt %, it may be difficult for the spinning solution to be formed into a fiber, and the spinning solution may not be spun into a fibrous phase and may be spun in a droplet state to form a film phase, or although spinning is performed, many beads may be formed and a solvent may not be volatized easily. Thus, pores may be clogged in a calendering process to be described below. In addition, when the fluorine-based compound is included in an amount exceeding 30 wt %, viscosity is increased to cause solidification on a surface of a solution, and thus, it may be difficult to perform spinning for a long time. In addition, a fiber diameter may be increased, and thus, a fibrous phase with a sub-micrometer size may not be formed.

The solvent may be used without limitation as long as it does not form a precipitate while dissolving the fiber-forming component, i.e., the fluorine-based compound and does not affect spinnability of a nanofiber to be described below. The solvent may include at least one selected from the group consisting of γ-butyrolactone, cyclohexanone, 3-hexanone, 3-heptanone, 3-octanone, N-methylpyrrolidone, dimethylacetamide, dimethyl sulfoxide, and dimethylformamide. In an example, the solvent may be a mixed solvent of dimethylacetamide and acetone.

The prepared spinning solution may be prepared into a nanofiber through a known electrospinning device and method. In an example, the electrospinning device may be an electrospinning device including a single spin pack with one spin nozzle or may be an electrospinning device including a plurality of single spin packs or a spin pack with a plurality of nozzles for mass production. In addition, in an electrospinning process, dry spinning or wet spinning using an external coagulation bath may be used, and the method is not limited.

When a stirred spinning solution is introduced into the electrospinning device and is electrospun on a collector such as paper, a fiber web layer composed of a desired nanofiber may be obtained. A specific condition for the electrospinning, for example, air pressure of air sprayed through an air spray nozzle provided in a nozzle of a spin pack may be set to a range of 0.01 MPa to 0.2 MPa. When the air pressure is less than 0.01 MPa, the air pressure may not contribute to collection and accumulation of the nanofiber. When the air pressure exceeds 0.2 MPa, a cone of the spin nozzle is hardened to generate blocking of needles, thereby resulting in spinning trouble. In addition, when the spinning solution is spun, an injection rate of the spinning solution per nozzle may be in a range of 10 μl/min to 30 μl/min. Further, a distance between a tip of the nozzle and the collector may be in a range of 10 cm to 30 cm. However, the present invention is not limited thereto, and the injection rate and the distance may be changed according to purpose.

Alternatively, a nanofiber may be directly electrospun on the above-described second support body to directly form a fiber web layer on the second support body. The nanofiber accumulated/collected on the second support body may have a three-dimensional network structure. Heat and/or pressure may be further applied to the accumulated/collected nanofiber so as to have a porosity, pore size, and basis weight suitable for exhibiting desired water permeability and filtration efficiency of a separation membrane, thereby implementing the nanofiber into a fiber web layer having a three-dimensional network structure. A known method may be adapted as a specific method of applying the heat and/or pressure, and as a non-limiting example thereof, a common calendering process may be used. In this case, temperature of the applied heat may be in a range of 70° C. to 190° C. Furthermore, when the calendering process is performed, the calendering process may be performed multiple times. For example, a drying process for removing a solvent and moisture remaining in the nanofiber may be performed through primary calendering, and then, secondary calendering may be performed to control porosity and improve strength. Here, a degree of heat and/or pressure applied in each calendering process may be the same or different.

On the other hand, when the second support body is implemented using a composite fiber including a low melting point component, bonding between the fiber web layer and the second support body through thermal fusion may be concurrently performed through the calendering process.

In addition, a separate hot melt powder or a hot melt web may be further interposed to bond the second support body and the fiber web layer. In this case, temperature of the applied heat may be in a range of 60° C. and 190° C., and the pressure may be applied in a range of 0.1 kgf/cm$^2$ to 10 kgf/cm$^2$, but the present invention is not limited thereto. Components separately added for the bonding may form a hum or may be dissolved in a water treatment process to cause negative environmental problems so that it is preferable that the second support body and the fiber web layer are bonded without adding the components.

Next, as step (2) according to the present invention, a step of treating the fiber web layer with the hydrophilic coating composition to prepare the media on which the hydrophilic coating layer is formed is performed.

Step (2) may include 2-1) treating the fiber web layer with hydrophilic coating composition on, and 2-2) heat-treating the hydrophilic coating composition to form the hydrophilic coating layer.

First, in step 2-1), the hydrophilic coating composition may include a hydrophilic component and a cross-linkable component.

The hydrophilic component may be the above-described hydrophilic polymer compound, for example, polyvinyl alcohol. The cross-linkable component may be the above-described cross-linking agent, for example, a cross-linking agent including a carboxyl group.

In addition, the hydrophilic coating composition may further include a solvent capable of dissolving the hydrophilic component and the cross-linkable component, and the solvent may include a known solvent capable of dissolving polyvinyl alcohol, for example, water. The hydrophilic coating composition may include 5 to 20 parts by weight of the cross-linking agent and 1,000 to 100,000 parts by weight of the solvent with respect to 100 parts by weight of the polyvinyl alcohol.

In this case, the polyvinyl alcohol may be included in an amount of 0.3 to 1.0 wt %, more preferably, 0.3 to 0.8 wt % with respect to the total weight of the hydrophilic coating composition. When the polyvinyl alcohol is included in an amount less than 0.3 wt % with respect to the hydrophilic coating composition, the hydrophilic coating layer may be non-uniformly applied or may not be formed to have a desired amount, and thus, an effect of improving hydrophilicity may be insignificant. In addition, when the polyvinyl alcohol is included in an amount exceeding 1.0 wt %, it is difficult to control a thickness of the hydrophilic coating layer, thereby resulting in a change in pore size or a pore closure in the fiber web layer.

On the other hand, due to strong hydrophobicity caused by material properties of the nanofiber forming the formed fiber web layer, although there is treatment of the hydrophilic coating composition, the coating composition may not permeate into the fiber web layer and may flow along a surface. Thus, it is difficult for the hydrophilic coating composition to reach the nanofiber disposed inside the fiber web layer. In addition, although the hydrophilic coating composition reaches the inside of the fiber web layer, the hydrophilic coating layer may not be properly formed on an outer surface of the nanofiber. In order to improve permeability of the hydrophilic coating composition into the fiber web layer, to wet the permeated hydrophilic coating composition in the outer surface of the nanofiber well, and to rapidly dry the hydrophilic coating composition so as to be applied to the nanofiber before the hydrophilic coating composition flows down, the hydrophilic coating composition may further include a wettability enhancer.

Any component may be used as the wettability enhancer without limitation as long as it may improve the wettability of a hydrophobic outer surface of a nanofiber with respect to a hydrophilic solution and may be easily evaporated and concurrently dissolved in the hydrophilic coating composition. In an example, the wettability enhancer may include at least one component selected from the group consisting of isopropyl alcohol, ethyl alcohol, and methyl alcohol. More preferably, in order to prevent shrinkage of a fiber web caused by the evaporation of the wettability enhancer and to prevent a change in initially designed pore structure of the fiber web caused by the shrinkage, the wettability enhancer may include isopropyl alcohol. In addition, the wettability enhancer may be included in an amount of 5,000 to 25,000 parts by weight with respect to 100 parts by weight of the polyvinyl alcohol included in the hydrophilic coating composition. When the wettability enhancer is included in an amount les than 5,000 parts by weight, improvement of the wettability of the nanofiber is insignificant, and thus the formation of the hydrophilic coating layer may not be smooth, and the hydrophilic coating layer may be frequently peeled off. Furthermore, when the wettability enhancer is included in an amount exceeding 25,000 parts by weight, a degree of improvement of the wettability may be insignificant, and concentrations of the polyvinyl alcohol and the cross-linking agent included in the hydrophilic coating composition are decreased so that the formation of the hydrophilic coating layer may not be smooth.

Meanwhile, a hydrophilic coating layer may be formed by pre-treating the fiber web layer with a wettability enhancer and then treatment with a hydrophilic coating composition without including the wettability enhancer in the hydrophilic coating composition. However, when a fiber web layer in which a wettability enhancer is supported in pores is immersed in a hydrophilic coating composition, a time required for the wettability enhancer supported in the pores to escape from the fiber web layer and for the hydrophilic coating composition to permeate the pores may be long, and thus manufacturing time may be prolonged. In addition, since a degree of permeability of the hydrophilic coating composition differs according to a thickness and a pore size of the fiber web layer, a hydrophilic coating layer may be non-uniformly formed according to positions of a fiber web. Furthermore, as the hydrophilic coating layer is non-uniformly formed, the pores may be clogged in a portion of the fiber web layer by the hydrophilic coating layer. In this case, an initially designed pore structure of the fiber web layer may be changed, and thus, desired flux may not be obtained. Therefore, it is advantageous to concurrently achieve a reduction in manufacturing time, simplification of a manufacturing process, and improvement in the formability of the hydrophilic coating layer without changing the pore structure of the fiber web layer.

Any known coating method may be used without limitation as a method of forming the above-described hydrophilic coating composition on the fiber web layer, for example, immersion, spraying or the like may be used.

Next, as step 2-2), a step of heat-treating the fiber web layer treated with the hydrophilic coating composition to form the hydrophilic coating layer may be performed.

Step 2-2) may be performed concurrently with a process of drying a solvent of the hydrophilic coating composition. The heat-treating may be performed in a dryer. In this case, temperature of applied heat may be in a range of 80° C. to 160° C., and a treatment time may be in a range of 1 minute to 60 minutes, but the present invention is not limited thereto.

Next, as step (3) according to the present invention, a step of providing the prepared media on the both surfaces of the first support body to manufacture the filter assembly is performed.

The step (3) may include 3-1) stacking the media prepared in step (2) on the both surfaces of the first support body, and 3-2) fusing the stacked first support body and media by applying at least one of heat and pressure.

A known method may be adapted as a specific method of applying the heat and/or pressure in step 3-2), and as a non-limiting example thereof, a common calendering process may be used. In this case, temperature of the applied heat may be in a range of 70° C. to 190° C. Furthermore, when the calendering process is performed, the calendering process may be performed multiple times. For example, primary calendering may be performed, and then, secondary calendering may be performed. Here, a degree of heat and/or pressure applied in each calendering process may be the same or different. In step 3-2), the second support body and the first support body may be bonded through thermal fusion, and thus, there may be an advantage in that a separate adhesive or adhesive layer may be omitted.

The present invention includes a filter module implemented to include the filter assembly manufactured through the above-described manufacturing method.

Figure 4A:
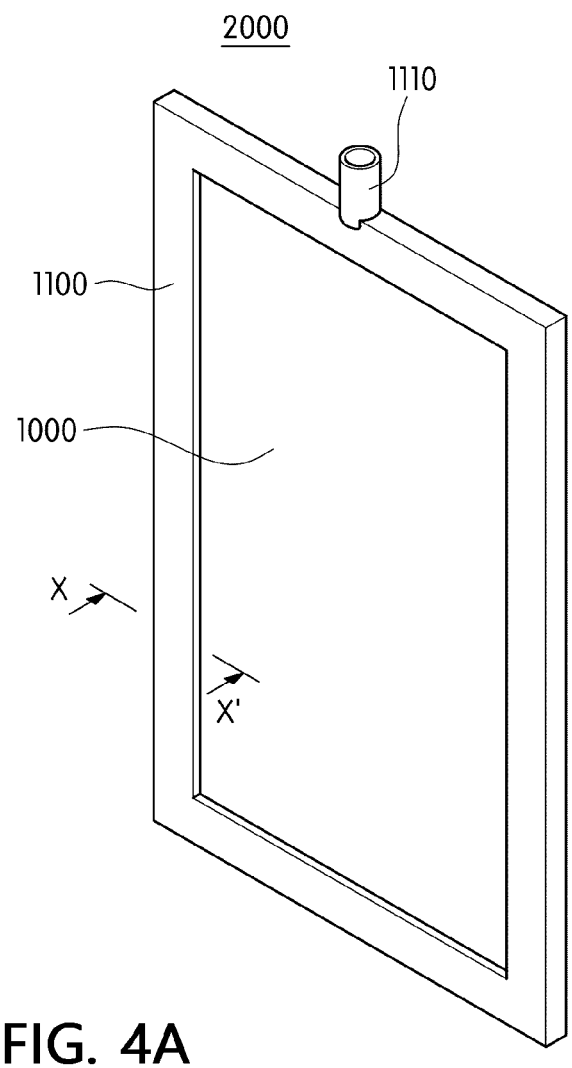
FIGS. 4A-4B are a set of views illustrating a flat filter module according to an exemplary embodiment of the present invention.
Figure 4B:
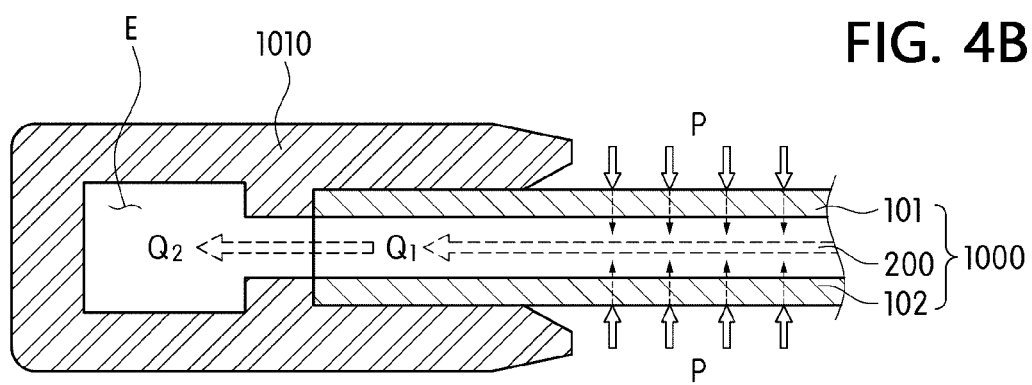

As shown in FIG. 4A, the filter assembly 1000 may be implemented as a flat filter module 2000. Specifically, the flat filter module 2000 includes the filter assembly 1000 and a support frame 1100 having a channel formed such that an introduced liquid to be filtered flows toward media 101 and 102 or a filtrate filtered in the media 101 and 102 is discharged to the outside, and configured to support an edge of the filter assembly. An inlet port 1110 may be provided in any one region of the support frame 1100 to allow a pressure difference between the outside and the inside of the filter assembly 1000. When the filter module 2000 shown in FIG. 4A is applied with a high pressure suction force through the inlet port 1110, a liquid P to be filtered, which is disposed outside the filter assembly 1000, flows toward the inside of the filter assembly 1000, as shown in FIG. 4B, a filtrate Q1 filtered through the media 101 and 102 flows along a channel formed through the support body 200 and then is introduced into a channel E provided in the support frame 1100. Then, an introduced filtrate Q2 may be discharged to the outside through the inlet port 1110.

Figure 5:
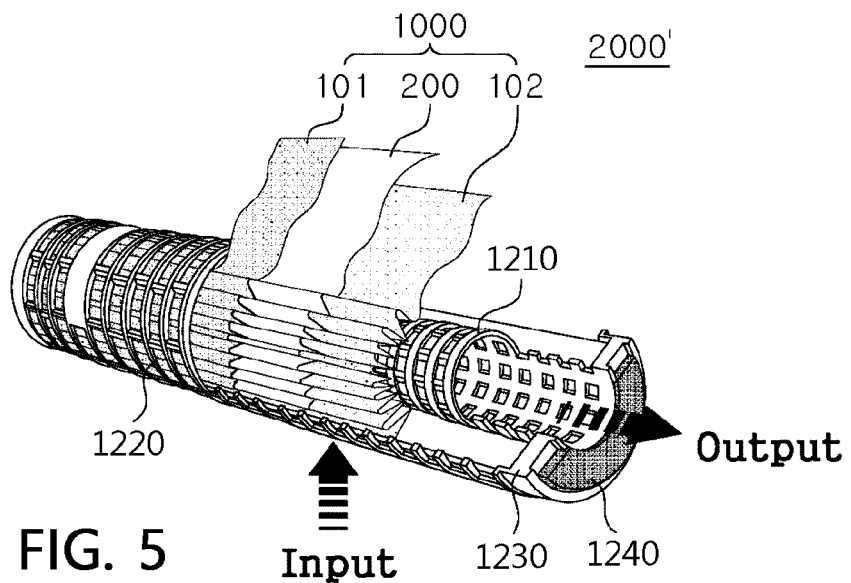
FIG. 5 is an exploded perspective view illustrating a cylindrical filter module according to an exemplary embodiment of the present invention.
Figure 6:
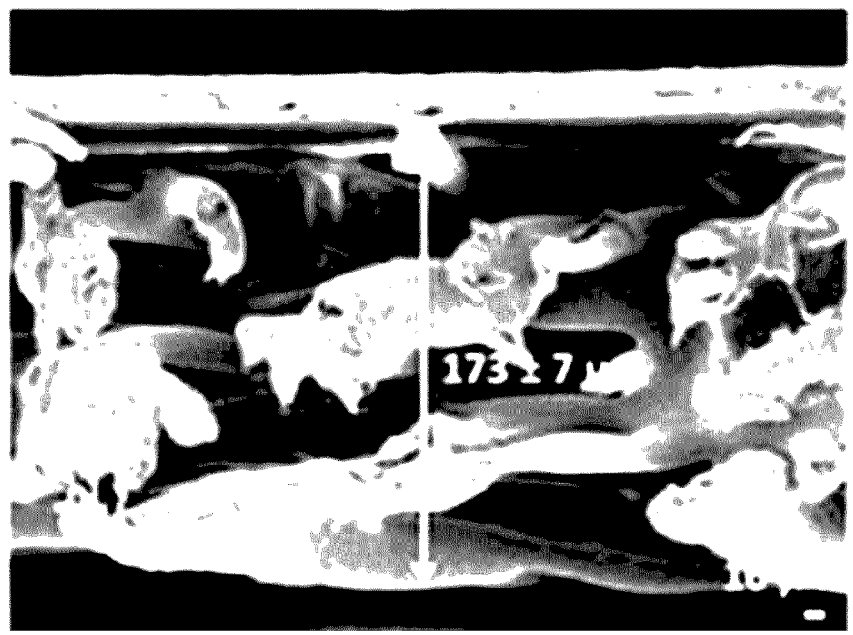
FIG. 6 is a scanning electron microscope (SEM) image showing a cross section of a medium included in an exemplary embodiment of the present invention.

In addition, as shown in FIG. 5, the filter assembly 1000 may be implemented as a cylindrical filter module 2000'. Specifically, the cylindrical filter module 2000' includes a porous permeating water outflow pipe 1210, the filter assembly 1000 wound around the porous permeating water outflow pipe 1210, and an outer case 1220 configured to house the filter assembly 1000 wound around the porous permeating water outflow pipe 1210. Here, the filter assembly 1000 may be wound around the porous permeating water outflow pipe 1210 in a bent shape shown in FIG. 5 to increase an effective filtration surface area, and may be assembled inside the outer case 1220 and be fixed by an end cap 1230. Furthermore, an O-ring or gasket 1240 to be assembled to a pipe through which filtered permeating water is discharged may be further provided. The filter module 2000' shown in FIG. 5 is configured such that a liquid to be filtered is introduced into the filter module 2000' through a side surface thereof and a filtrate filtered through the filter assembly 1000 is discharged through the porous permeating water outflow pipe 1210 and is collected.

In addition, a plurality of unit filter modules shown in FIGS. 4A and 5 may be provided inside one case or one water treatment device to constitute a large water treatment apparatus.

MODE OF THE INVENTION

The present invention will be described in more detail through the following examples, the following examples do not limit the scope of the present invention, and it should be understood that the following examples are intended to assist the understanding of the present invention.

Example 1

First, in order to prepare a spinning solution, 12 g of PVDF (Kynar 761 manufactured by Arkema Inc.) as a fiber-forming component was dissolved in 88 g of a mixed solution, which is obtained by mixing dimethylacetamide and acetone in a weight ratio of 70:30, at a temperature of 80° C. for 6 hours using a magnetic bar to prepare a mixed solution. The spinning solution was introduced into a solution tank of an electrospinning device and was ejected at a rate of 15 μl/min/hole. Here, temperature of a spinning section was maintained at 30° C., humidity was maintained at 50%, and a distance between a collector and the tip of a spin nozzle was 20 cm. After that, a voltage of 40 kV or more was applied to a spin nozzle pack using a high voltage generator, and concurrently, an air pressure of 0.03 MPa was applied to each nozzle of the spin pack to form a fiber web layer composed of a PVDF nanofiber. Next, in order to dry a solvent and moisture remaining in the fiber web layer, a calendaring process was performed by applying heat with a temperature of 140° C. and a pressure of 1 kgf/cm². The formed fiber web layer was immersed in a hydrophilic coating composition prepared in Preparation Example below and then was dried in a dryer at a temperature of 110° C. for 5 minutes to form a fiber web layer including a hydrophilic coating layer. After the fiber web layer including the formed hydrophilic coating layer was disposed on one surface of a second support body, i.e., a non-woven fabric (CCP40 manufactured by Namyang Nonwoven Fabric Co., Ltd), composed of a low melting point composite fiber with a thickness of 200 μm and a melting point of about 120° C. including polyethylene as a sheath portion and polypropylene as a core portion, a calendering calendaring process was performed again by applying heat with a temperature of 140° C. and a pressure of 1 kgf/cm², thereby preparing a medium in which the fiber web layer and the second support body are fused to each other.

Figure 7A:
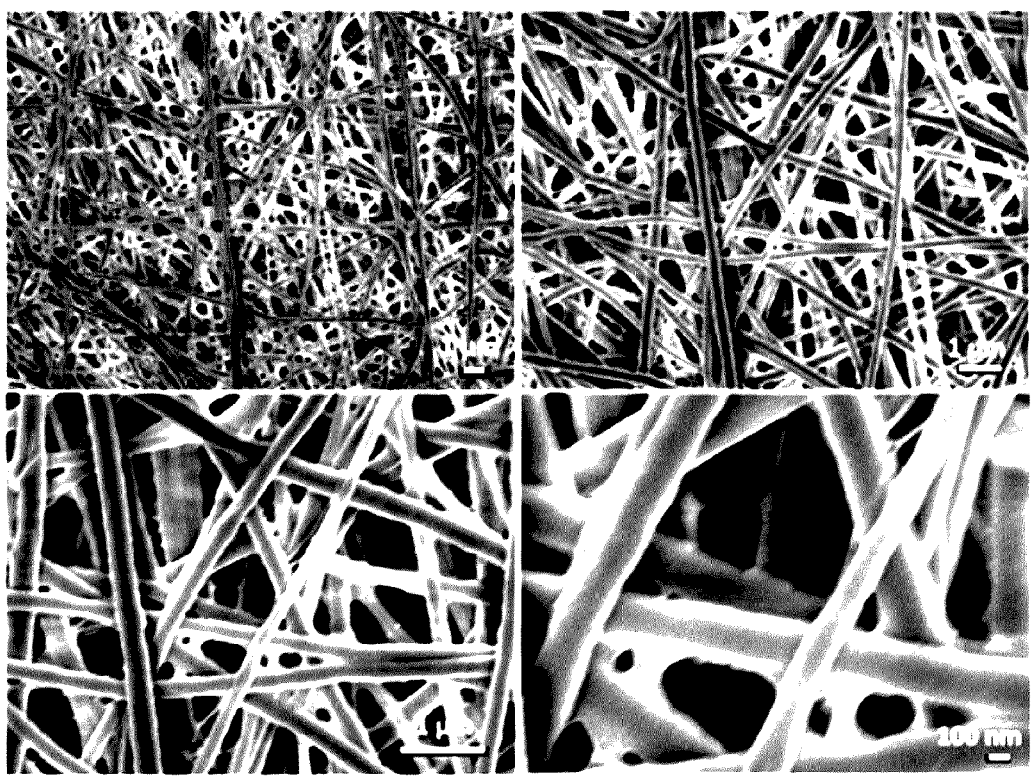
FIGS. 7A and 7B are images showing a fiber web layer included in an exemplary embodiment of the present invention.
Figure 7B:
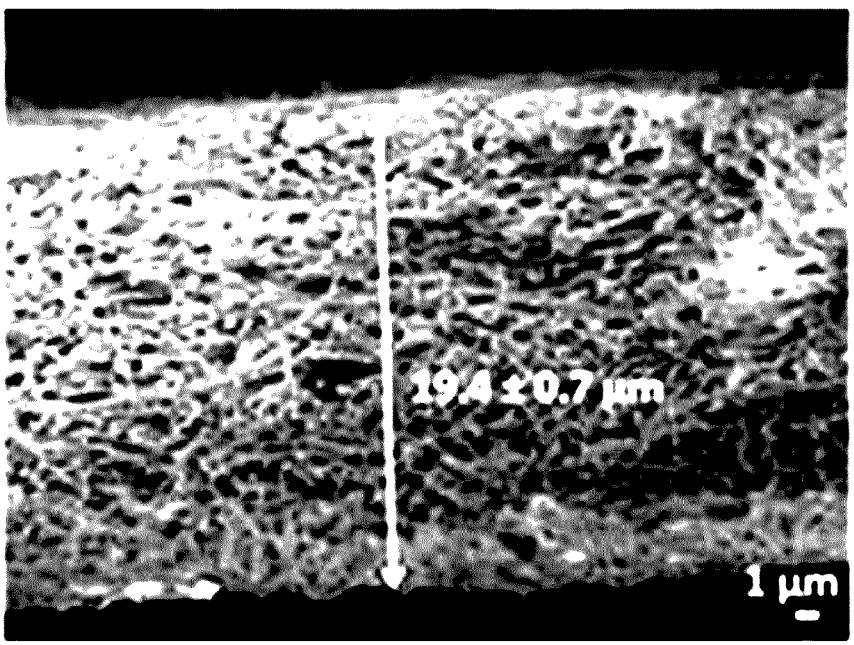
Figure 7C:
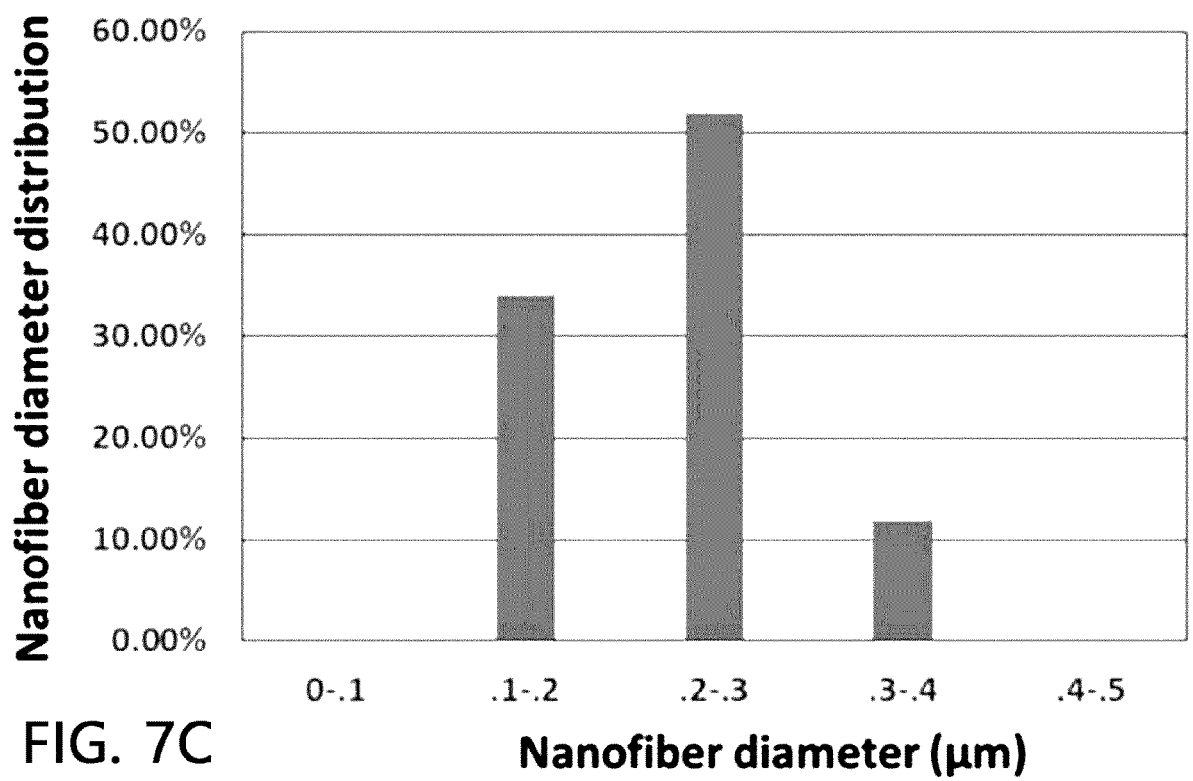
FIG. 7C is a graph showing a diameter distribution of a nanofiber included in the fiber web layer.
Figure 7D:
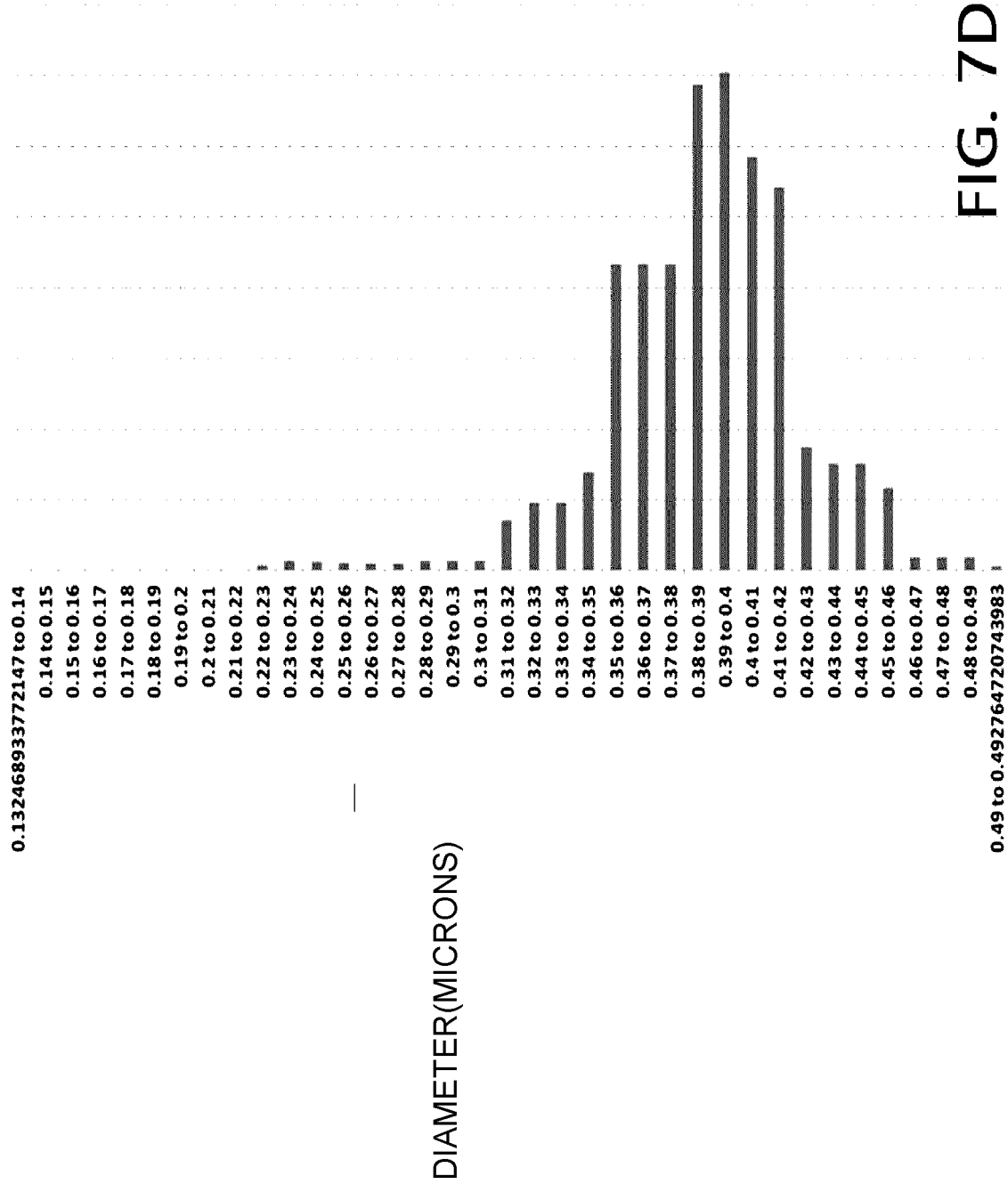
FIG. 7D is a graph showing a pore size distribution of the fiber web layer.

The fiber web layer in the medium had a three-dimensional network structure like that shown in FIGS. 7A and 7B. In this case, a diameter distribution of a nanofiber provided in the fiber web layer was identical to that shown in FIG. 7C, and a pore size distribution of the fiber web layer was identical to that shown in FIG. 7D.

Two sheets of the prepared media were disposed on both sides of the first support body such that the second support body in the medium faced the first support body. In this case, the first support body was formed of a nonwoven fabric (NP450 manufactured by Namyang Nonwoven Fabric Co., Ltd) composed of a low melting point composite fiber with a thickness of 200 μm and a melting point of about 120° C. including polyethylene as a sheath portion and polypropylene as a core portion. A filter assembly was manufactured by applying heat with a temperature of 140° C. and a pressure of 1 kgf/cm².

<Preparation Example> Hydrophilic Coating Composition 7,142 parts by weight of ultrapure water was mixed with respect to 100 parts by weight of polyvinyl alcohol (PVA217 manufactured by Kuraray Co.) with a saponification degree of 88% and a weight average molecular weight of 75,000 as a hydrophilic component, and then, PVA was dissolved therein at a temperature of 80° C. for 6 hours using a magnetic bar to prepare a mixed solution. The mixed solution was cooled to a temperature of 25° C., and then, polyacrylic acid-co-maleic acid (PAM manufactured by Sigma-Aldrich Co. LLC) as a cross-linking agent was mixed into the mixed solution such that the polyacrylic acid-co-maleic acid was included in an amount of 15 parts by weight with respect to 100 parts by weight of polyvinyl alcohol, and was dissolved at a temperature of 25° C. for 12 hours.

99.99% isopropyl alcohol (IPA manufactured by Duksan Chemical Co.) was added to the mixed solution such that the isopropyl alcohol was included in an amount of 7,142 parts by weight with respect to 100 parts by weight of the polyvinyl alcohol, and was mixed for 2 hours to prepare a hydrophilic coating layer-forming composition. The polyvinyl alcohol was included in an amount of 0.69 wt % with respect to the total weight of the prepared hydrophilic coating composition.

Examples 2 to 18

A filter assembly like that shown in Table 1, 2, or 3 below was manufactured in the same manner as in Example 1, except that a composition and the like of a hydrophilic coating composition was changed as in Table 1, 2, or 3 below.

Comparative Example 1

A filter assembly like that shown in Table 3 below was manufactured in the same manner as in Example 1, except that there was no treatment with a hydrophilic coating composition.

Experimental Example 1

The following physical properties of a fiber web on which a hydrophilic coating layer was formed before the fiber web is laminated to a second support body during a manufacturing process of filter assemblies according to Examples and Comparative Example were evaluated and shown in Tables 1 to 3 below.

1. Measurement of Wetting Angle

A contact angle between a surface of a fiber web layer and a surface of a water droplet was measured with a contact angle (°) measuring device in order to measure wettability of the exposed surface of the fiber web layer with respect to water. A method of photographing a shape of a droplet using a charge-coupled device (CCD) camera and then calculating interfacial tension (γ) optimized for the shape of the finally photographed shape of the droplet was used. An injection volume was set to 0.05 mL through a microsyringe, and secondary distilled water was used. Contact angles were measured at five points on the surface of the fiber web layer within 20 seconds after the droplet was formed, and an average value thereof and an average deviation were calculated according to the above-described Expression 1.

2. Evaluation of Hydrophilic Coating Layer Amount

A basis weight of a fiber web formed before treatment of a hydrophilic coating composition and a basis weight after the hydrophilic coating layer was formed were calculated, and an amount of the hydrophilic coating layer was evaluated with a difference between the basis weights.

3. Measurement of Average Pore Size of Fiber Web

In order to evaluate whether a pore structure of a fiber web layer is changed after a hydrophilization modification, a pore size distribution after the modification was measured, a prometer manufactured by PMI was used, and Galwick was used as a wetting liquid. A measurement result was expressed as an average pore size, and then, an average pore size of each of the fiber web layers according to Examples was expressed as a relative percentage with respect to 100% of an average pore size of the fiber web layer of Comparative Example 1. It can be expected that, as an average pore size deviates from 100%, an initially designed pore structure of a fiber web is changed due to the formation of a hydrophilic coating layer.

Experimental Example 2

Each of the filter assemblies according to Examples and Comparative Example was implemented as a flat membrane module like that shown in FIGS. 4A and 4B, and then, an operation pressure of 50 kPa was applied to measure water permeability per a specimen area of 0.5 m². Water permeability of each of the filter media according to the remaining Examples and Comparative Example 1 was relatively shown in Tables 1 to 3 with respect to 100% of water permeability of the filter assembly according to Example 1.

TABLE 1

|  |  |  | Example 1 | Example 2 | Example 3 | Example 4 | Example 5 | Example 6 | Example 7 |
|---|---|---|---|---|---|---|---|---|---|
| Hydrophilic coating composition | PVA | Weight average molecular weight | 75,000 | 75,000 | 75,000 | 75,000 | 75,000 | 75,000 | 75,000 |
|  |  | Saponification degree | 88 | 88 | 88 | 88 | 88 | 88 | 88 |
|  |  | Amount (wt %) | 0.69 | 0.15 | 0.23 | 0.32 | 0.78 | 0.83 | 1.1 |
|  | Crosslinking agent | Number of carboxyl groups | 3 | 3 | 3 | 3 | 3 | 3 | 3 |
|  |  | Amount (parts by weight) | 15 | 15 | 15 | 15 | 15 | 15 | 15 |
|  | Wettability enhancer | Type | IPA | IPA | IPA | IPA | IPA | IPA | IPA |
|  |  | Amount (parts by weight) | 7,142 | 7,142 | 7,142 | 7,142 | 7,142 | 7,142 | 7,142 |
| Filter assembly | Amount of hydrophilic coating layer (g/m²) |  | 0.81 | 0.22 | 0.37 | 0.71 | 0.88 | 0.98 | 1.21 |
|  | Average wetting angle (°) |  | 25 | 83 | 72 | 38 | 25 | 23 | 24 |
|  | Average deviation of wetting angle (°) |  | 1.1 | 17.5 | 14.7 | 4.8 | 0.9 | 0.7 | 0.7 |
|  | Relative average pore size (%) |  | 100 | 100 | 100 | 100 | 98 | 93 | 80 |
|  | Relative water permeability (%) |  | 100 | 29 | 40 | 86 | 94 | 86 | 76 |

TABLE 2

|  |  |  | Example 8 | Example 9 | Example 10 | Example 11 | Example 12 | Example 13 |
|---|---|---|---|---|---|---|---|---|
| Hydrophilic coating composition | PVA | Weight average molecular weight | 75,000 | 75,000 | 75,000 | 75,000 | 75,000 | 75,000 |
|  |  | Saponification degree | 88 | 88 | 88 | 88 | 88 | 88 |
|  |  | Amount (wt %) | 0.69 | 0.69 | 0.69 | 0.69 | 0.69 | 0.69 |
|  | Crosslinking agent | Number of carboxyl groups | 3 | 3 | 3 | 3 | 3 | 3 |
|  |  | Amount (parts by weight) | 1 | 3 | 8 | 11 | 19 | 22 |

TABLE 2-continued

|  |  |  | Example 8 | Example 9 | Example 10 | Example 11 | Example 12 | Example 13 |
|---|---|---|---|---|---|---|---|---|
|  | Wettability enhancer | Type | IPA | IPA | IPA | IPA | IPA | IPA |
|  |  | Amount (parts by weight) | 7,142 | 7,142 | 7,142 | 7,142 | 7,142 | 7,142 |
| Filter assembly | Amount of hydrophilic coating layer (g/m$^2$) |  | 0.11 | 0.18 | 0.65 | 0.79 | 1.2 | 0.44 |
|  | Average wetting angle (°) |  | 108 | 92 | 40 | 28 | 17 | 61 |
|  | Average deviation of wetting angle (°) |  | 2.4 | 15.8 | 6.9 | 3.6 | 4.7 | 13.1 |
|  | Relative average pore size (%) |  | 100 | 100 | 100 | 100 | 84 | 63 |
|  | Relative water permeability (%) |  | 0 | 22 | 82 | 94 | 81 | 51 |

TABLE 3

|  |  |  | Example 14 | Example 15 | Example 16 | Example 17 | Example 18 | Comparative Example 1 |
|---|---|---|---|---|---|---|---|---|
| Hydrophilic coating composition | PVA | Weight average molecular weight | 10,000 | 150,000 | 75,000 | 75,000 | 75,000 | — |
|  |  | Saponification degree | 86 | 92 | 88 | 88 | 88 | — |
|  |  | Amount (wt %) | 0.69 | 0.69 | 0.69 | 0.69 | 0.69 | — |
|  | Cross-linking agent | Number of carboxyl groups | 3 | 3 | 3 | 3 | 3 | — |
|  |  | Amount (parts by weight) | 15 | 15 | 15 | 15 | 15 | — |
|  | Wettability enhancer | Type | IPA | IPA | — | IPA | EtOH | — |
|  |  | Amount (parts by weight) | 7,142 | 7,142 | 0 | 4,000 | 7,142 | — |
| Filter assembly | Amount of hydrophilic coating layer (g/m$^2$) |  | 0.41 | 2.06 | 0.26 | 0.71 | 0.80 | 0 |
|  | Average wetting angle (°) |  | 66 | 23 | 84 | 37 | 26 | 110 |
|  | Average deviation of wetting angle (°) |  | 2.1 | 1.7 | 13.1 | 0.9 | 1.1 | 1.3 |
|  | Relative average pore size (%) |  | 100 | 51 | 100 | 100 | 93 | 100 |
|  | Relative water permeability (%) |  | 53 | 44 | 29 | 88 | 91 | 0 |

As can be seen from Tables 1 to 3, the filter assembly including a PVDF fiber web according to Comparative Example 1, in which a hydrophilic coating layer was not formed, had strong hydrophobicity, and thus, it can be confirmed that water permeability was measured to be zero.

Among Examples, it can also be confirmed that the degree and uniformity of a formed hydrophilic coating layer were changed according to an amount of PVA in a hydrophilic coating composition, a weight average molecular weight of the PVA, and/or an amount of a cross-linking agent. In the case of some Examples, it can be confirmed that an initially designed pore structure of the media was not maintained as an average pore size is decreased, as compared with the medium of Comparative Example 1.

Furthermore, it can be confirmed that the degree of formation of a hydrophilic coating layer or the average pore size of an implemented medium was changed according to the amount and type of a wettability enhancer, which influences water permeability of an implemented filter assembly.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

The invention claimed is:

1. A filter assembly for water treatment comprising:
media each including a fiber web layer which has a three-dimensional network structure including a polyvinylidene fluoride (PVDF) nanofiber and includes a hydrophilic coating layer covering at least a portion of an outer surface of the PVDF nanofiber; and
a first support body configured to support the media and to form a channel, wherein the media are provided on both surfaces of the first support body, wherein the first support body comprises a nonwoven fabric,
wherein the hydrophilic coating layer is formed by cross-linking a hydrophilic polymer compound including a polyvinyl alcohol (PVA) and a cross-linking agent including a carboxyl group,
wherein the hydrophilic coating layer includes 10 to 20 parts by weight of the cross-linking agent with respect to 100 parts by weight of the polyvinyl alcohol,
wherein the cross-linking agent includes poly(acrylic acid-co-maleic acid),
wherein the hydrophilic coating layer is provided on the PVDF nanofiber disposed on an outer surface of the fiber web layer and the PVDF nanofiber disposed in the fiber web layer, wherein the hydrophilic coating layer covers the nanofiber in an amount of 0.65 g to 2 g per unit area (m$^2$) of the fiber web layer, and wherein an average initial wetting angle is less than or equal to 40° and an average deviation of an initial wetting angle is less than or equal to 7° at any five different points on an exposed surface of the fiber web layer on which the hydrophilic coating layer is formed.

2. The filter assembly for water treatment of claim 1, wherein each of the media further includes a second support body provided on one side of the fiber web layer, and the second support body is disposed to face the first support body.

3. The filter assembly for water treatment of claim 1, wherein the first support body includes a composite fiber which includes a support component and a low melting point component and is disposed such that at least a portion of the low melting point component is exposed at an outer surface thereof, and the low melting point component of the composite fiber is thermally fused to the media.

4. The filter assembly for water treatment of claim 2, wherein the second support body includes a composite fiber which includes a support component and a low melting point component and is disposed such that at least a portion of the low melting point component is exposed at an outer surface thereof, wherein an interface of the fiber web layer, which faces the second support body, is thermally fused through the low melting point component of the composite fiber, and an interface of the first support body, which faces the second support body, is thermally fused.

5. The filter assembly for water treatment of claim 1, wherein the fiber web layer has an average pore size of 0.1 μm to 5 μm and a porosity of 40% to 90%.

6. The filter assembly for water treatment of claim 1, wherein the PVDF nanofiber has a diameter of 0.05 μm to 2 μm.

7. The filter assembly for water treatment of claim 1, wherein the polyvinyl alcohol has a weight average molecular weight of 20,000 to 100,000 and a saponification degree of 85% to 90%.

8. The filter assembly for water treatment of claim 1, wherein the first support body has a basis weight of 200 g/m² to 800 g/m² and a thickness of 1 mm to 10 mm.

9. A method of manufacturing a filter assembly for water treatment, the method comprising:
  (1) forming a fiber web layer with a three-dimensional network structure including a polyvinylidene fluoride (PVDF) nanofiber;
  (2) manufacturing a filtration medium on which a hydrophilic coating layer is formed by treating the fiber web layer with a hydrophilic coating composition, wherein the hydrophilic coating composition comprises a hydrophilic polymer compound including a polyvinyl alcohol (PVA), a cross-linking agent including a carboxyl group for cross-linking the PVA, and a wettability enhancer including isopropyl alcohol, wherein the cross-linking agent includes poly(acrylic acid-co-maleic acid), and wherein the hydrophilic coating composition includes 10 to 20 parts by weight of the cross-linking agent and 5000 to 25000 parts by weight of the wettability enhancer with respect to 100 parts by weight of the polyvinyl alcohol, respectively; and
  (3) providing the filtration medium on both surfaces of a first support body, wherein the first support body comprises a nonwoven fabric, wherein the hydrophilic coating layer is provided on the PVDF nanofiber disposed on an outer surface of the fiber web layer and the PVDF nanofiber disposed in the fiber web layer, wherein the hydrophilic coating layer covers the nanofiber in an amount of 0.65 g to 2 g per unit area (m²) of the fiber web layer, wherein an average initial wetting angle with respect to any five different points on an exposed surface of the fiber web layer on which the hydrophilic coating layer is formed is less than or equal to 40° and an average deviation of an initial wetting angle with respect to the five points is less than or equal to 7°.

10. The method of claim 9, wherein step (3) further includes thermally fusing the first support body and the fiber web layer by applying any one of heat and pressure to the first support body and fiber web layer.

11. The method of claim 9, wherein the hydrophilic coating composition includes 0.3 to 1 part by weight of polyvinyl alcohol (PVA) as the hydrophilic polymer compound.

12. A filter module for water treatment comprising the filter assembly according to claim 1.

* * * * *